US011091131B2

(12) United States Patent
Lee

(10) Patent No.: US 11,091,131 B2
(45) Date of Patent: *Aug. 17, 2021

(54) ACTUATOR OF ELECTRONIC BRAKE SYSTEM

(71) Applicant: MANDO CORPORATION, Gyeonggi-do (KR)

(72) Inventor: Youngsong Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/143,474

(22) Filed: Sep. 27, 2018

(65) Prior Publication Data

US 2019/0100172 A1     Apr. 4, 2019

(30) Foreign Application Priority Data

Sep. 29, 2017   (KR) .................. 10-2017-0127692

(51) Int. Cl.
| | |
|---|---|
| *B60T 13/74* | (2006.01) |
| *B60T 7/04* | (2006.01) |
| *F16H 25/24* | (2006.01) |
| *B60T 11/10* | (2006.01) |
| *B60T 13/66* | (2006.01) |
| *B60T 11/16* | (2006.01) |
| *B60T 13/68* | (2006.01) |
| *B60T 8/36* | (2006.01) |

(Continued)

(52) U.S. Cl.
CPC ............. *B60T 7/042* (2013.01); *B60T 8/368* (2013.01); *B60T 8/4018* (2013.01); *B60T 8/4081* (2013.01); *B60T 11/102* (2013.01); *B60T 11/165* (2013.01); *B60T 13/662* (2013.01); *B60T 13/686* (2013.01); *B60T 13/745* (2013.01); *F16H 25/2015* (2013.01); *F16H 25/2454* (2013.01); *F16H 2025/2075* (2013.01)

(58) Field of Classification Search
CPC .......... B60T 13/745; F16H 2025/2075; F16H 25/2015; F16H 25/2454
See application file for complete search history.

(56) References Cited

U.S. PATENT DOCUMENTS

| | | | |
|---|---|---|---|
| 9,768,670 B2 * | 9/2017 | Kim ..................... | H02K 5/225 |
| 2004/0075339 A1 * | 4/2004 | Volz ..................... | H02K 7/14 |
| | | | 303/116.4 |

(Continued)

FOREIGN PATENT DOCUMENTS

EP       2 520 473       11/2012

*Primary Examiner* — Bradley T King
(74) *Attorney, Agent, or Firm* — Ladas & Parry, LLP

(57) ABSTRACT

Disclosed is an actuator of an electronic brake system including: a drive unit generating a power and including a motor having a stator and a rotor; a piston unit operated by the drive unit and including a piston reciprocating in a bore chamber provided in a piston housing to contain a fluid; a power transmission unit having one end coupled to the rotor and the other end coupled to the piston to convert a rotational motion of the rotor into a linear motion of the piston; a sensing magnet coupled to the power transmission unit to rotate along the motor; and a motor position sensor disposed coaxially with and spaced apart from the sensing magnet to sense a position of the motor based on the rotation of the sensing magnet.

11 Claims, 4 Drawing Sheets

(51) Int. Cl.
*B60T 8/40* (2006.01)
*F16H 25/20* (2006.01)

(56) References Cited

U.S. PATENT DOCUMENTS

| | | | |
|---|---|---|---|
| 2012/0160043 A1* | 6/2012 | Drumm | F16H 25/20 |
| | | | 74/89.23 |
| 2014/0265547 A1* | 9/2014 | Ganzel | B60T 13/168 |
| | | | 303/66 |
| 2018/0009425 A1* | 1/2018 | Feigel | B60T 13/145 |
| 2018/0065609 A1* | 3/2018 | Leiber | B60T 8/368 |
| 2018/0148031 A1* | 5/2018 | Knechtges | B60T 8/4077 |
| 2019/0100188 A1* | 4/2019 | Lee | B60T 13/745 |
| 2020/0208698 A1* | 7/2020 | Kim | F16D 65/14 |

\* cited by examiner

[Fig. 1]
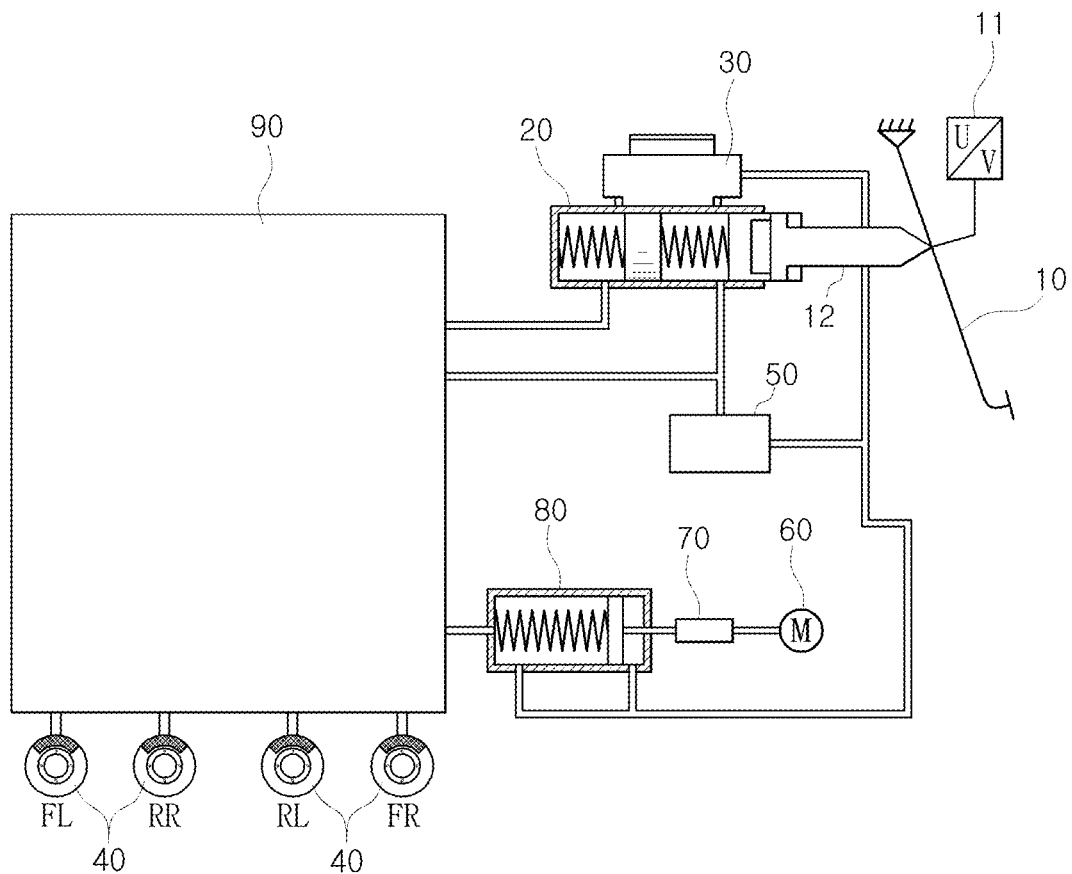

[Fig. 2]
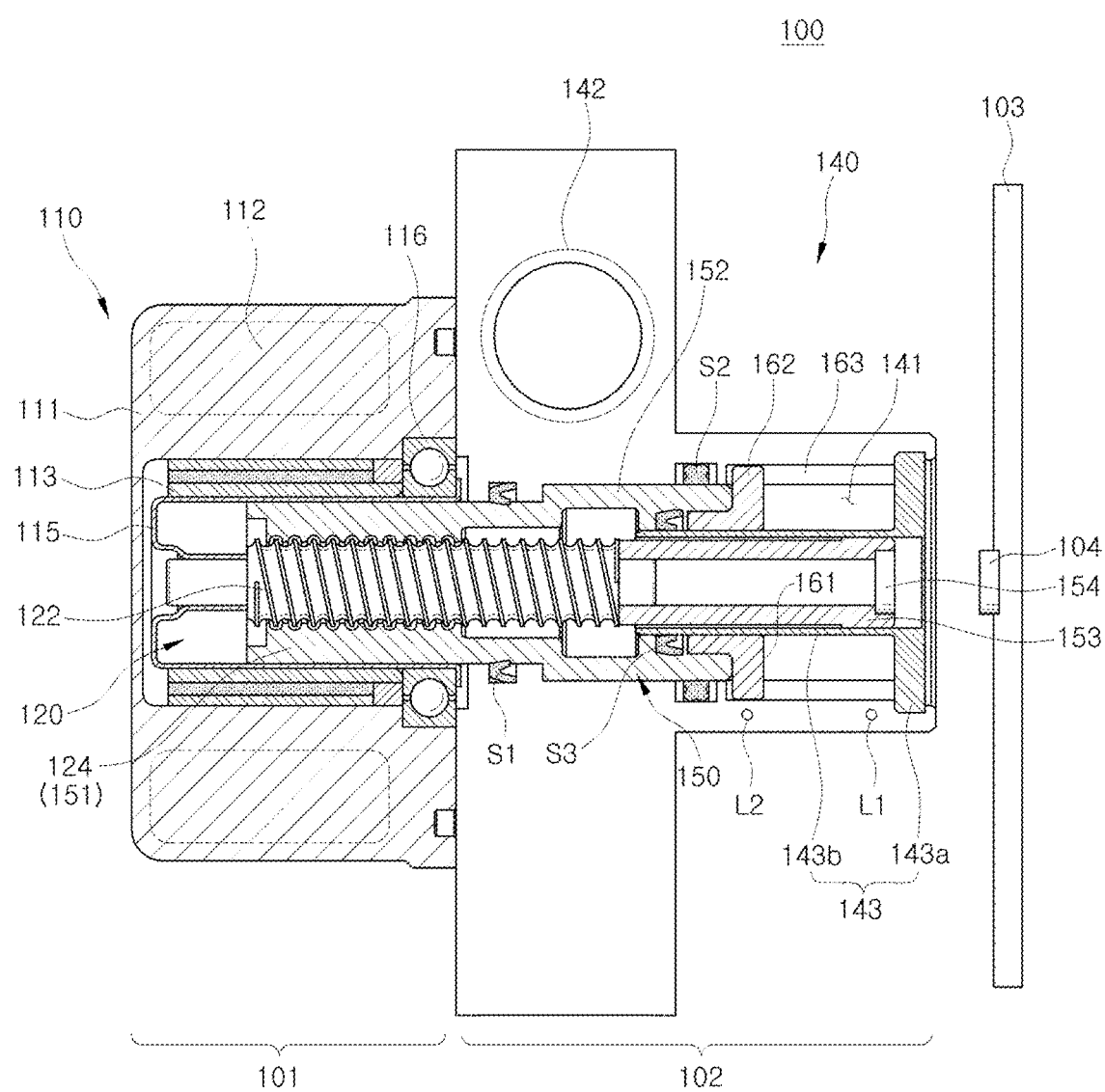

[Fig. 3]
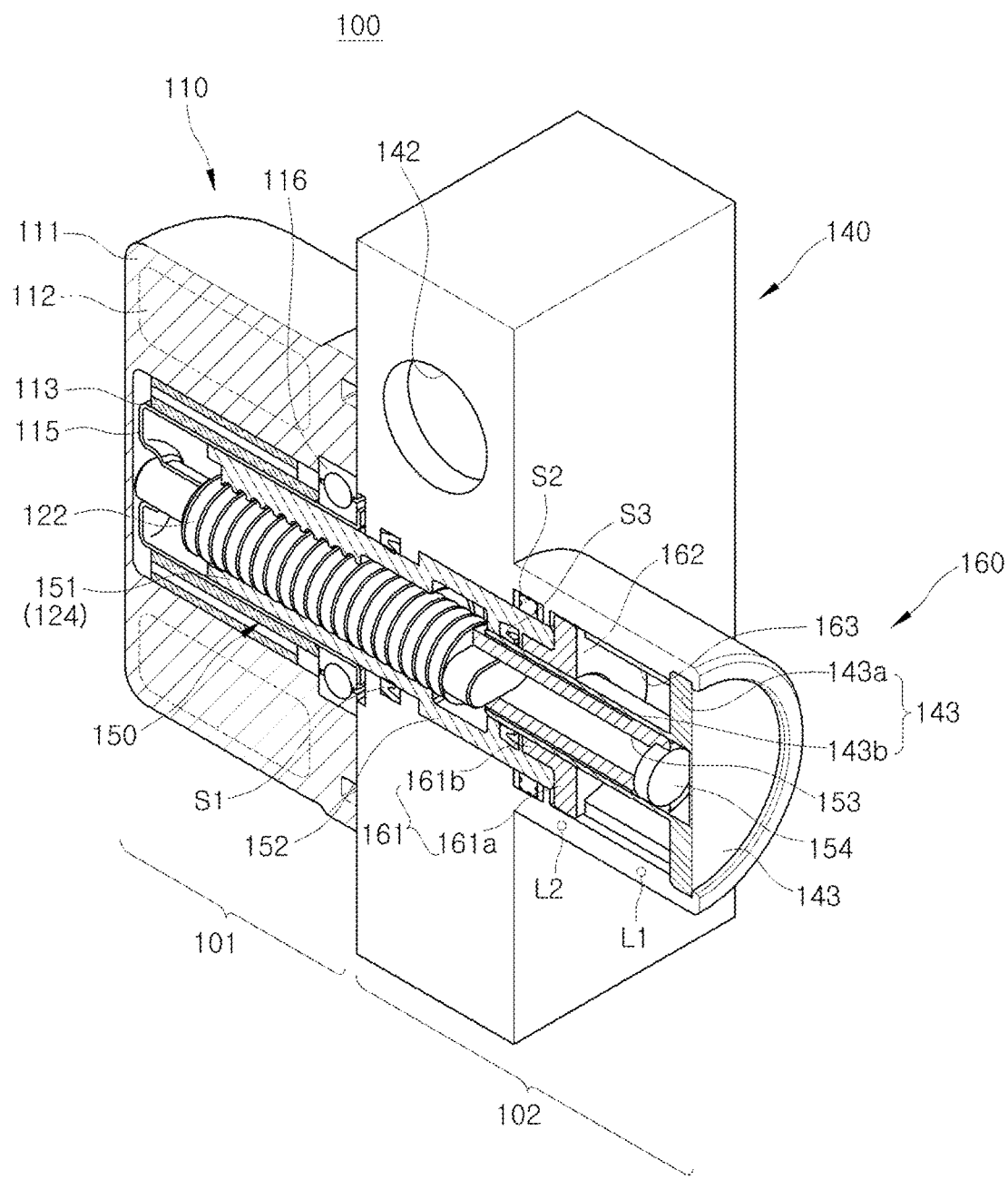

[Fig. 4]
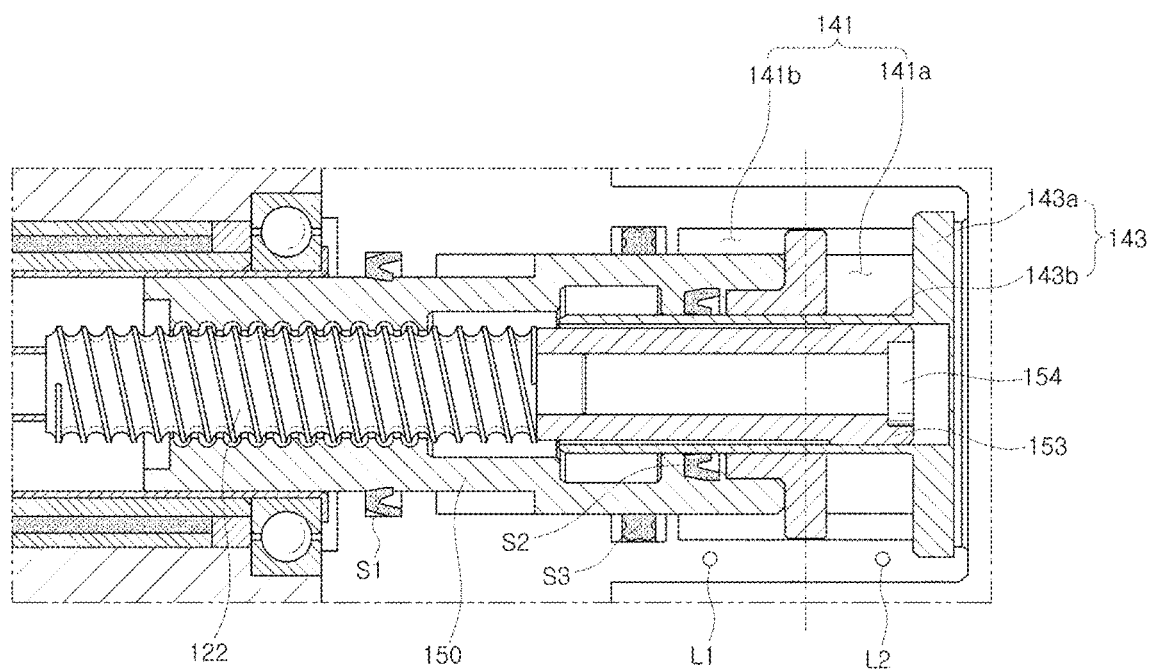

ACTUATOR OF ELECTRONIC BRAKE SYSTEM

CROSS-REFERENCE TO RELATED APPLICATION(S)

This application is based on and claims priority under 35 U.S.C. § 119 to Korean Patent Application No. 10-2017-0127692, filed on Sep. 29, 2017 in the Korean Intellectual Property Office, the disclosure of which is incorporated by reference herein in its entirety.

1. Technical Field

The present disclosure relates to an electronic brake system, and more particularly, to an electronic brake system that generates a braking force using an electrical signal corresponding to a displacement of a brake pedal and an actuator used therefor.

2. Background

In general, a vehicle is equipped with a brake system for braking. Recently, various types of brake systems have been proposed to obtain a more powerful and stable braking force.

For example, such a brake system includes an anti-lock brake system (ABS) for preventing slippage of the wheels during braking, a brake traction control system (BTCS) for preventing the drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

In the conventional brake system, when the driver depresses the brake pedal, a hydraulic pressure necessary for braking is supplied to the wheel cylinder using a mechanically connected vacuum booster. However, in recent years, an electronic brake system including an actuator, which receives an electric signal of the driver's braking will from a pedal displacement sensor that senses displacement of the brake pedal when the driver depresses the brake pedal and supplies the hydraulic pressure required for braking to the wheel cylinder, is widely used.

According to the document of EP 2520473A1, the electronic brake system activates a motor of the actuator according to a pedal effort of the brake pedal, converts a rotational force of the motor into a linear motion, and pressurizes a piston to generate a hydraulic pressure necessary for braking.

SUMMARY

It is an aspect of the present disclosure to provide an actuator of an electronic brake system capable of reducing the number of components and improving assemblability and productivity.

Additional aspects of the present disclosure will be set forth in part in the description which follows and, in part, will be obvious from the description, or may be learned by practice of the disclosure.

In accordance with one aspect of the present disclosure, there may be provided an actuator of an electronic brake system including: a drive unit generating a power and including a motor having a stator and a rotor; a piston unit operated by the drive unit and including a piston reciprocating in a bore chamber provided in a piston housing to contain a fluid; a power transmission unit having one end coupled to the rotor and the other end coupled to the piston to convert a rotational motion of the rotor into a linear motion of the piston; a sensing magnet coupled to the power transmission unit to rotate along the motor; and a motor position sensor disposed coaxially with and spaced apart from the sensing magnet to sense a position of the motor based on the rotation of the sensing magnet.

Further, the power transmission unit may include a spindle coupled to the rotor to rotate together with the rotor and a nut screwed to the spindle, and the nut may be provided integrally with the piston.

Further, the bore chamber may be provided to pass through the piston housing, and one end of the bore chamber may be coupled to and sealed by the drive unit, and the other end of the bore chamber may be sealed by a bore cap.

Further, the rotor may include a hollow cylinder therein, and the power transmission unit may be provided in the hollow cylinder and a space forming the bore chamber.

Further, the piston may include a rotation preventing member, and the rotation preventing member may include a rotation preventing ring provided at an end of the piston, at least one rail protrusion provided to protrude from the rotation preventing ring, and at least one rail groove provided along a longitudinal direction on an inner wall of the bore chamber so that the at least one rail protrusion is slidably moved therein.

Further, the motor position sensor may be provided in an electronic control unit.

Further, the spindle of the power transmission unit may further include a magnet holder provided to extend into the bore chamber, and the sensing magnet may be provided at an end of the magnet holder.

Further, the actuator of an electronic brake system may further include a bore cap for sealing an end of the bore chamber, wherein the bore cap may include a cap body provided in a disk shape, and a cap cylinder provided to extend from the cap body to the drive unit, and the cap cylinder may accommodate the magnet holder therein.

Further, the bore chamber may be divided into a first chamber and a second chamber by the piston, and the piston may generate a hydraulic pressure in the first chamber when the piston moves in one direction and generate a hydraulic pressure in the second chamber when the piston moves in the other direction.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a schematic view of an electronic brake system including an actuator according to an embodiment of the present disclosure;

FIG. 2 illustrates an actuator of an electronic brake system according to an embodiment of the present disclosure;

FIG. 3 is a partially cut perspective view of an actuator of an electronic brake system according to an embodiment of the present disclosure; and FIG. 4 is an enlarged view for explaining a piston unit of an actuator in an electronic brake system according to an embodiment of the present disclosure.

DETAILED DESCRIPTION

Hereinafter, embodiments of the present disclosure will be described in detail with reference to the accompanying drawings. The embodiments described below are provided by way of example so that those skilled in the art can fully understand the spirit of the present disclosure. The present disclosure is not limited to the embodiments described below, but may be embodied in other forms. In order to clearly illustrate the present disclosure, parts not related to the description are omitted from the drawings. In the drawings, the width, length, thickness, etc. of components may be exaggerated for convenience. Like reference numerals designate like elements throughout the specification.

Before describing an actuator according to an embodiment of the present invention, an electronic brake system will be briefly described first with reference to FIG. 1.

FIG. 1 schematically illustrates an electronic electric brake system of a vehicle. As shown in FIG. 1, the electronic electric brake system of a vehicle may include a master cylinder 20, a reservoir 30, wheel cylinders (FR, FL, RR, and RL) 40, a pedal simulator 50, a motor 60, a power transmission unit 70, a pump 80, and a hydraulic circuit unit 90 for controlling the above components.

The master cylinder 20 performs a function to generate a hydraulic pressure by being pressurized by an input rod 12 when a driver operates the brake pedal 10, and the generated hydraulic pressure is transmitted to the pedal simulator 50. The pedal simulator 50 transmits a reaction force corresponding to the generated hydraulic pressure to the brake pedal 10 via the master cylinder 20 again so that the driver feels the pedal feeling. If the braking is not normally performed, the hydraulic pressure in the master cylinder 20 is directly transmitted to the wheel cylinders 40 so that the vehicle may be subjected to emergency braking.

On the other hand, in the normal braking state, the pump 80 transmits the hydraulic pressure to the wheel cylinders 40. Specifically, when the driver depresses the brake pedal 10, a pedal displacement sensor 11 detects a displacement of the brake pedal 10 and transmits it to an electronic control unit (ECU) 103 (refer to FIG. 2), and the electronic control unit 103 drives the motor 60 based on the displacement of the brake pedal 10. The rotational motion generated by the motor 60 is converted into a linear reciprocating motion by the power transmission unit 70 to press a piston in the pump 80, and the piston moves a fluid contained in a chamber of the pump 80 toward the wheel cylinders 40 to generate a braking force.

The reservoir 30, which is a means for storing a fluid, is provided to communicate with the master cylinder 20, the wheel cylinders 40, the pedal simulator 50, and the pump 80.

The hydraulic circuit unit 90 includes flow passages (not shown) for transferring the fluid between the master cylinder 20, the pump 80 and the wheel cylinders 40 and a plurality of valves (not shown) for interrupting the fluid flow in the flow passages. The arrangement of each component and the operation of controlling the components by the electronic control unit are well known in the art of vehicle braking, and thus detailed description thereof will be omitted.

An actuator 100 (refer to FIG. 2) according to the present embodiment may include the motor 60 and the power transmission unit 70 described above.

FIG. 2 is a cross-sectional view of an actuator of an electronic brake system according to an embodiment of the present disclosure.

Referring to FIG. 2, the actuator 100 according to the present embodiment includes a drive unit 101 that generates power and a piston unit 102 that is operated by the power of the drive unit 101 to generate a hydraulic pressure, which may be effectively controlled by the electronic control unit 103.

The drive unit 101 generates power by an electric signal of the pedal displacement sensor 11 provided on the brake pedal 10, and the piston unit 102 provides a braking pressure to the wheel cylinders (FR, FL, RR, and RL) 40 using the hydraulic pressure generated by advancing and retracting the piston by the power of the drive unit 101.

The electronic control unit 103 may include a printed circuit board (not shown) on which electronic elements for controlling the drive unit 101, solenoid valves and the like are mounted. For reference, the pedal displacement sensor 11 detects a displacement of the brake pedal 10 and transmits an electric signal to the electronic control unit 103, and the electronic control unit 103 analyzes the signal of the pedal displacement sensor 11 to calculate the braking pressure required by the driver and outputs signals for controlling the drive unit 101, the piston unit 102, and various valves so as to satisfy the driver's requested braking pressure.

More specifically, the drive unit 101 includes a motor 110 that generates a rotational force with the supply of power. The motor 110 is a device for generating a rotational force by a signal output from the electronic control unit 103 and may generate a rotational force in a forward direction or a reverse direction. The rotational angular velocity and rotational angle of the motor 110 may be precisely controlled.

The motor 110 includes a stator 112 and a rotor 113. The stator 112 is fixed to a motor housing 111 and is provided in a ring or donut shape to form a first hollow portion therein. The rotor 113 is disposed inside the hollow portion of the stator 112 and forms a cylindrical second hollow portion therein as in the stator.

The drive unit 101 may also include at least one magnetic body (not shown) for generating a rotational force to the motor 110, and the magnetic body is disposed on an outer circumferential surface of the rotor 113 and rotates together with the rotor 113.

A hollow cylinder 115 is provided in the second hollow portion provided inside the rotor 113. The hollow cylinder 115 is provided in the form of a cup having one side opened, and may share an internal space with a bore chamber of the piston unit 102 which will be described later. A gap is formed between the stator 112 and the magnetic body so that the rotor 113 may rotate without interfering with the stator 112 when the motor 110 is driven.

The drive unit 101 may further include a ball bearing 116 interposed between the motor housing 111 and the rotor 113. That is, the ball bearing 116 is interposed between the motor housing 111 provided with the stator 112 and the hollow cylinder 115 of the rotor 113 to guide the rotation of the rotor 113.

The drive unit 101 may also include the power transmission unit 120 that converts a rotational motion of the motor 110 into a linear motion and transmits the linear motion to a piston 150 of the piston unit 102. The power transmission unit 120 is installed in a cylindrical space formed by the hollow cylinder 115 of the drive unit 101 and a bore chamber 141 of the piston unit 102.

The power transmission unit 120 may include a spindle 122 provided at a center of rotation of the motor 110 and a nut 124 screwed to the spindle 122.

The spindle 122 is coupled at one end to a closed end surface of the hollow cylinder 115 provided in the rotor 113 and rotates together with the rotor 113. That is, since the spindle 122 must rotate together with the rotor 113 when the motor is driven, the hollow cylinder 115 of the rotor 113 and the spindle 122 may be coupled using a fixed pin (not shown) or may be coupled in the form of a groove and a projection such as a polygon or an ellipse that is not a circular so that the spindle 122 and the rotor 113 are firmly coupled to each other. The spindle 122 is formed with screw threads on its outer circumferential surface.

The nut 124 may include a hollow portion therein to allow the spindle 122 to pass therethrough, and screw grooves may be formed on the inner circumferential surface of the hollow portion so as to be engaged with the screw threads of the spindle 122. The spindle 122 and the nut 124 may be coupled in a ball-screw coupling manner in which rolling balls are interposed between the screw threads and the screw grooves to facilitate mutual screw movement. Since the rotation of the nut 124 is restricted by a rotation preventing member provided on the piston 150 of the piston unit 102, which will be described later, the rotational motion of the spindle 122 may be converted into a linear reciprocating motion by the nut 124.

The piston unit 102 includes a piston housing 140 having the bore chamber 141 formed therein, and the piston 150 reciprocating linearly in the bore chamber 141.

The piston housing 140 may be assembled to one side of the motor 110, and the bore chamber 141 is provided coaxially with the hollow cylinder 115 of the drive unit 101 when coupled with the motor housing 111 to form a space in which the piston 150 may be installed. That is, the bore chamber 141 is a space in which the piston 150 may reciprocate, and also a space for containing a fluid that generates the hydraulic pressure by the movement of the piston 150.

The bore chamber 141 is provided in the piston housing 140 in the form of a through hole having opposite open ends. One end of the bore chamber 141 is coupled to the motor housing 111 so as to communicate with the hollow cylinder 115 of the driving unit 101 as described above and the other end is sealed by a bore cap 143. The bore chamber 141 may be provided with multiple steps, with the bore cap side being provided with a larger diameter than the drive unit side.

The bore cap 143 includes a cap body 143*a* provided in a disc shape and a cap cylinder 143*b* extending from the cap body 143*a* toward the drive unit 101. The cap cylinder 143*b* is provided to have a smaller diameter than the piston 150 so that the cap cylinder 143*b* may be partially accommodated in the piston 150, and a cylinder bore is formed therein. Further, the cap cylinder 143*b* is provided coaxially with the spindle 122, and a part of the spindle 122 is accommodated in the cylinder bore, which will be described later in detail.

The piston housing 140 may further include a hollow portion 142 in a direction perpendicular to the bore chamber 141. At least one of the master cylinder 20 and the input rod 12 is inserted into the hollow portion 142, thereby minimizing the size of an integral type electronic braking apparatus.

The piston 150 moves forward and backward in the bore chamber 141 of the piston housing 140 in which the fluid is received by the driving of the motor 110, and generates a hydraulic pressure necessary for braking. To this end, the piston 150 is engaged with the nut 124 to slide in the bore chamber 141. According to the present embodiment, the piston 150 may be integrally provided with the nut 124.

The piston 150 may include a piston body 151 provided in a cylindrical shape and a piston head 152 having a larger diameter than the piston body 151. The piston body 151 and the piston head 152 include a hollow portion penetrating the inside thereof.

Since the piston body 151 has the function of the nut 124 as described above, screw threads are formed on the hollow portion of the piston body 151 so that the spindle 122 of the power transmission unit 120 may be engaged in a screw-nut manner.

An outer circumferential surface of the piston head 152 is slidably coupled to the bore chamber 141 of the piston housing 140 and a magnet holder 153, which will be described later, is coupled to the hollow portion of the piston head 152.

The piston body 151 and the piston head 152 are provided with a first sealing member S1 and a second sealing member S2 for preventing the fluid contained in the bore chamber 141 from escaping. The first sealing member S1 is provided between the piston body 151 and the piston housing 140, and the second sealing member S2 is provided between the piston head 152 and the piston housing 140. In the present embodiment, the first and second sealing members S1 and S2 are installed in recessed grooves provided in the inner wall of the bore chamber 141 of the piston housing 140. However, the present disclosure is not limited thereto and the first and second sealing members S1 and S2 may be installed in a recessed groove provided in the piston body 151 and the piston head 152, respectively.

The piston head 152 may also include a third sealing member S3 for preventing the fluid contained within the bore chamber 141 from escaping out through the hollow portion therein. The third sealing member S3 may be formed by recessing an end of the piston head 152 inward. The third sealing member S3 is provided in the form of a cup seal, and may be sealed with a seal cap for preventing disengagement.

The piston 150 includes a rotation preventing member 160 that prevents the piston 150 from rotating along the spindle 122 of the power transmission unit 120 when the motor is driven.

As shown in FIG. 3, the rotation preventing member 160 includes a rotation preventing ring 161 provided at an end of the piston 150, at least one rail protrusion 162 provided at the rotation preventing ring 161, and at least one rail groove 163 provided on an inner wall of the bore chamber 141 so that the at least one rail protrusion 162 is slidably moved therein.

The rotation preventing ring 161 is provided to be substantially equal to the outer diameter of the piston head 152, and includes a hollow body 161*a* and a sleeve 161*b* provided on the body 161*a* in a thickness direction. The body 161*a* and the sleeve 161*b* may be coupled to an end of the piston head 152 to perform the function of a seal cap for preventing the third sealing member S3 from being disengaged.

The at least one rail protrusion 162 is provided on an outer circumferential surface of the body 161*a* of the rotation preventing ring 161. In the present embodiment, two of the rail protrusions 162 are provided toward upper and lower sides of the bore chamber 141 at intervals of 180 degrees, but the present disclosure is not limited thereto. Likewise, two of the rail grooves 163 are formed on upper and lower sides of the bore chamber 141 to correspond to the respective rail protrusions 162.

The rail protrusions 162 are slidably coupled to the rail grooves 163 provided along a longitudinal direction on the inner wall of the bore chamber 141, respectively.

Accordingly, since the rotation of the nut 124 or the piston 150 is restricted by the rail protrusions 162 and the rail groove 163 of the rotation preventing member 160 when the spindle 122 of the power transmission unit 120 is rotated by the driving of the motor 110, the piston 150 is moved forward and backward in the bore chamber 141 without rotating.

The cylindrical magnet holder 153 extending from the spindle 122 is coupled to an inner hollow portion of the rotation preventing ring 161. The magnet holder 153 rotates together with the spindle 122 of the power transmission unit 120 when the spindle 122 rotates. To this end, one side of the magnet holder 153 may be coupled to an end of the spindle 122 in a non-circular manner.

A sensing magnet 154 may be provided on the other side of the magnet holder 153, that is, on the side adjacent to the electronic control unit 103. A motor position sensor 104 mounted on the electronic control unit 103 directly detects a position of the motor 110, for example, a rotational direction and a RPM based on the magnetic flux change caused by the rotation of the sensing magnet 154 spaced apart from the position sensor 104. The motor position sensor 104 is mounted on the printed circuit board disposed in the electronic control unit 103. The motor position sensor 104 may be disposed at a position corresponding to the sensing magnet 154, that is, at a position where a rotation axis of the sensing magnet 154 coincides with a center of the motor position sensor 104 in order to further improve the detection capability.

On the other hand, according to the present embodiment, the piston unit 102 may be provided as a double acting type piston. That is, as shown in FIG. 4, the bore chamber 141 in which the fluid is contained may be divided into a first chamber 141a positioned at front of the piston head 152 and a second chamber 141b positioned at the rear of the piston 150.

The first chamber 141a and the second chamber 141b may be connected to at least one or more of the wheel cylinders (FR, FL, RR, and RL) 40 (refer to FIG. 1) to provide a hydraulic pressure. For example, as the piston 150 moves forward, the hydraulic pressure formed in the first chamber 141a may be transmitted to at least one or more of the wheel cylinders (FR, FL, RR, and RL) 40 through a first hydraulic passage L1, and as the piston 150 moves backward, the hydraulic pressure formed in the second chamber 141b may be transmitted to at least one or more of the wheel cylinders (FR, FL, RR, and RL) 40 through a second hydraulic passage L2.

Also, the first and second chambers 141a and 141b may be connected to the wheel cylinders (FR, FL, RR, and RL) 40, respectively, to remove a hydraulic pressure. For example, the braking fluid in the wheel cylinders (FR, FL, RR, and RL) 40 may be introduced into the first chamber 141a through the first hydraulic passage L1 by a negative pressure formed in the first chamber 141a as the piston 150 moves backward, and the braking fluid in the wheel cylinders (FR, FL, RR, and RL) 40 may be introduced into the second chamber 141b through the second hydraulic passage L2 by a negative pressure formed in the second chamber 141b as the piston 150 moves forward.

When the piston 150 moves forward, a hydraulic pressure may be generated in the first chamber 141a or a negative pressure may be generated in the second chamber 141b. Conversely, when the piston 150 moves backward, a negative pressure may be generated in the first chamber 141a or a hydraulic pressure may be generated in the second chamber 141b. Whether to apply the braking pressure to the wheel cylinders (FR, FL, RR, and RL) 40 using the hydraulic pressure in the chamber or whether to release the braking pressure using the negative pressure in the chamber may be determined by the control of the valves by the electronic control unit 103.

The first chamber 141a is partitioned by the piston housing 140 and the front end of the piston 150 and is provided to vary its volume according to the movement of the piston 150. Likewise, the second chamber 141b is partitioned by the piston housing 140 and the rear end of the piston 150 and is provided to vary its volume according to the movement of the piston 150.

In addition, the piston 150 may be provided such that a first effective area for forming the hydraulic pressure in the first chamber 141a is larger than a second effective area for forming the hydraulic pressure in the second chamber 141b.

As is apparent from the above, the actuator of the electronic brake system according to an embodiment of the present disclosure can reduce the size of the actuator through efficient spatial arrangement and further improve the assemblability and productivity by providing the rotation preventing member for preventing the rotation of the nut during rotation of the spindle of the power transmission unit inside the piston.

Further, the actuator of the electronic brake system according to an embodiment of the present disclosure can provide the hydraulic pressure more quickly and control the pressure increase more precisely by configuring the piston in a double-acting manner.

Further, the actuator of the electronic brake system according to an embodiment of the present disclosure can improve the detection capability of the motor position sensor and reduce the size of the actuator through efficient spatial arrangement by mounting the sensing magnet for detecting a position of the motor to an end of the power transmission unit and by disposing the motor position sensor coaxially with the corresponding electronic control unit spaced apart from the sensing magnet.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An actuator of an electronic brake system comprising:
a drive unit generating a power and including a motor having a stator and a rotor;
a piston unit operated by the drive unit and including a piston reciprocating in a bore chamber provided in a piston housing to contain a fluid;
a power transmission unit having one end coupled to the rotor and the other end coupled to the piston to convert a rotational motion of the rotor into a linear motion of the piston;
a sensing magnet coupled to the power transmission unit to rotate along the motor; and
a motor position sensor disposed coaxially with and spaced apart from the sensing magnet to sense a position of the motor based on the rotation of the sensing magnet,
wherein the power transmission unit includes a spindle coupled to the rotor to rotate together with the rotor, the spindle including a magnet holder provided to extend into the bore chamber, and the sensing magnet is provided at an end of the magnet holder and located in the bore chamber containing the fluid.

2. The actuator of an electronic brake system according to claim 1,
wherein the power transmission unit further includes a nut screwed to the spindle, and
the nut is provided integrally with the piston.

3. The actuator of an electronic brake system according to claim 1,
wherein the bore chamber is provided to pass through the piston housing, and one end of the bore chamber is coupled to and sealed by the drive unit, and the other end of the bore chamber is sealed by a bore cap.

4. The actuator of an electronic brake system according to claim 1,
wherein the rotor includes a hollow cylinder therein, and
the power transmission unit is provided in the hollow cylinder and a space forming the bore chamber.

5. The actuator of an electronic brake system according to claim 1,
wherein the piston includes a rotation preventing member, and
the rotation preventing member includes a rotation preventing ring provided at an end of the piston, at least one rail protrusion provided to protrude from the rotation preventing ring, and at least one rail groove provided along a longitudinal direction on an inner wall of the bore chamber so that the at least one rail protrusion is slidably moved therein.

6. The actuator of an electronic brake system according to claim 1,
further comprising a bore cap for sealing an end of the bore chamber,
wherein the bore cap includes a cap body provided in a disk shape, and a cap cylinder provided to extend from the cap body to the drive unit, and
the cap cylinder accommodates the magnet holder therein.

7. The actuator of an electronic brake system according to claim 1,
wherein the bore chamber is divided into a first chamber and a second chamber by the piston, and
the piston generates a hydraulic pressure in the first chamber when the piston moves in one direction and generates a hydraulic pressure in the second chamber when the piston moves in the other direction.

8. The actuator of the electronic brake system according to claim 1, wherein the sensing magnet is positioned between the motor and a cap body sealing the fluid of the bore chamber.

9. The actuator of the electronic brake system according to claim 1, wherein the piston housing comprises: one end portion of the piston housing connected with the drive unit including the motor, and an opposite end portion of the piston housing where the sensing magnet is positioned inside the bore chamber containing the fluid.

10. The actuator of an electronic brake system according to claim 1, wherein the motor position sensor is provided on an electronic control unit.

11. The actuator of an electronic brake system according to claim 1, wherein the motor position sensor is provided on an electronic control unit, and the piston unit is positioned between the drive unit and the electronic control unit.

* * * * *